United States Patent
Duffield et al.

(10) Patent No.: US 7,293,086 B1
(45) Date of Patent: Nov. 6, 2007

(54) TRAFFIC MATRIX ESTIMATION METHOD AND APPARATUS

(75) Inventors: Nicholas G. Duffield, New York, NY (US); Albert Gordon Greenberg, Summit, NJ (US); John G. Klincewicz, Wayside, NJ (US); Matthew Roughan, Morristown, NJ (US); Yin Zhang, Lake Hiawatha, NJ (US)

(73) Assignee: AT&T Corp., New York, NY (US)

( * ) Notice: Subject to any disclaimer, the term of this patent is extended or adjusted under 35 U.S.C. 154(b) by 1017 days.

(21) Appl. No.: 10/627,767

(22) Filed: Jul. 25, 2003

Related U.S. Application Data

(60) Provisional application No. 60/398,474, filed on Jul. 25, 2002.

(51) Int. Cl.
*G06F 15/173* (2006.01)

(52) U.S. Cl. ...................................................... 709/224

(58) Field of Classification Search ................ 709/223, 709/224
See application file for complete search history.

(56) References Cited

U.S. PATENT DOCUMENTS

| | | | | |
|---|---|---|---|---|
| 5,946,612 | A * | 8/1999 | Johansson | 455/405 |
| 6,192,031 | B1 * | 2/2001 | Reeder et al. | 370/230 |
| 6,209,033 | B1 * | 3/2001 | Datta et al. | 709/224 |
| 6,512,822 | B2 * | 1/2003 | Pasztor et al. | 379/134 |
| 6,640,105 | B1 * | 10/2003 | Shin | 455/453 |
| 6,768,715 | B2 * | 7/2004 | Hsu et al. | 370/229 |

* cited by examiner

*Primary Examiner*—David Y. Eng

(57) ABSTRACT

A method and apparatus for the estimation of traffic matrices in a network are disclosed. Mechanisms are disclosed for measuring traffic volume from a plurality of ingress points to a plurality of egress points in a large scanl network, such as an IP backbone network. The traffic matrix is advantageously inferred from widely available link load measurements such as SNMP data.

10 Claims, 6 Drawing Sheets

```
%
%   weighted least-squares estimate of
%   the traffic matrix
%
%   Input:
%       A     matrix A in constraints x=A*t
%       x     vector x in constraints x=A*t
%       tg    initial gravity model solution
%       w     weight vector
%
%   Output:
%       t     estimated traffic matrix (as a
%             vector) that minimizes |(t-tg)./w|
%             among all t's that minimize |A*t-x|
%
function [t] wlse(A,x,tg,w)

%   equivalently transform x=A*t into
    %   xw=Aw*tw, where tw=(t-tg)./w
    xw = x - A*tg;
    [r, c] = size(A);
    Aw = A .* repmat(w', r, 1);

%   solve tw=Aw*tw by computing the pseudo-
    %   inverse of matrix Aw (through svd)
    tw = pinv(full(Aw)) * xw;

%   transform tw back to t
    t = tg + w .* tw;
```

FIG. 6

TRAFFIC MATRIX ESTIMATION METHOD AND APPARATUS

The present utility patent application is a non-provisional of provisional patent application, "FAST ACCURATE COMPUTATION OF LARGE-SCALE IP TRAFFIC MATRICES FROM LINK LOADS," Ser. No. 60/398,474, filed on Jul. 25, 2002, the contents of which are incorporated by reference herein.

BACKGROUND OF THE INVENTION

The present invention relates generally to network management and, more particularly, to estimation of traffic matrices in a network.

A traffic matrix provides, for every ingress point i into a network and egress point j out of the network, the volume of traffic $T_{i,j}$ from i to j over a given time interval. The traffic matrix, together with network topology and routing and fault data, can facilitate diagnosis and management of network congestion—as well as provide critical inputs to network design, capacity planning and business planning. Unfortunately, traffic matrices are generally unavailable in large operational Internet Protocol ("IP") networks. Rather, typical production systems gather data on resource utilization at network nodes and links (e.g. link loads); end-to-end performance metrics for specific transactions (such as one way delay statistics for packets exchanged between measurement servers at the network edge); and status and configuration of network topology and routing. Though these may reveal traffic anomalies or congestion problems, they do not in general reveal potential solutions. For instance, link load measurements may reveal congestion on a link, but shed little light on its cause, which in general requires understanding the traffic matrix.

The inability of network operators to measure the traffic matrix is a fundamental obstacle to developing sounds methods for network and traffic engineering in operational IP networks.

SUMMARY OF INVENTION

The present invention is directed to mechanisms for measuring traffic volume from a plurality of ingress points to a plurality of egress points in a large scale network, such as an IP backbone network. The present invention infers the traffic matrix advantageously from widely available link load measurements, such as SNMP data. First, such data is collected and used to construct a gravity model of link to link traffic to capture an overall distribution of the volume of traffic. Additional information on routing between points of ingress and egress for traffic flows can be incorporated to obtain significantly improved results, e.g., the model can incorporate information to model traffic exchanged with peer networks in a typical IP backbone network. Second, the traffic matrix is estimated by determining the matrix that minimizes a distance metric to an initial tomographic solution based on the gravity model, subject to tomographic constraints. Quadratic programming can be utilized to determine the solution in the space of those admitted by the tomographic constraints closest to the solution obtained by the gravity model. This step advantageously does not require (higher-order) statistics or additional traffic modeling assumptions. Applying network configuration and routing data to remove empty demands from the traffic matrix serves to dramatically decrease the problem dimension of computing the pseudo-inverse of the routing matrix. Then iterative proportional fitting can be used to ensure that non-physical results are replaced. The resulting traffic matrix comprises elements that accurately estimate the traffic volume from the plurality of ingress points to the plurality of egress points in the network.

The present invention is especially accurate for large elements and is robust, easily coping with data glitches and loss. The present invention is fast and flexible, easily extending to incorporate more detailed measurements where available. The present invention enables true network engineering, such as reliability analysis, traffic engineering, and capacity planning, in an IP framework.

These and other advantages of the invention will be apparent to those of ordinary skill in the art by reference to the following detailed description and the accompanying drawings.

BRIEF DESCRIPTION OF DRAWINGS

FIG. 6 is illustrative MATLAB source code for computing a weighted least-squares estimate of the traffic matrix.

DETAILED DESCRIPTION

Figure 1:
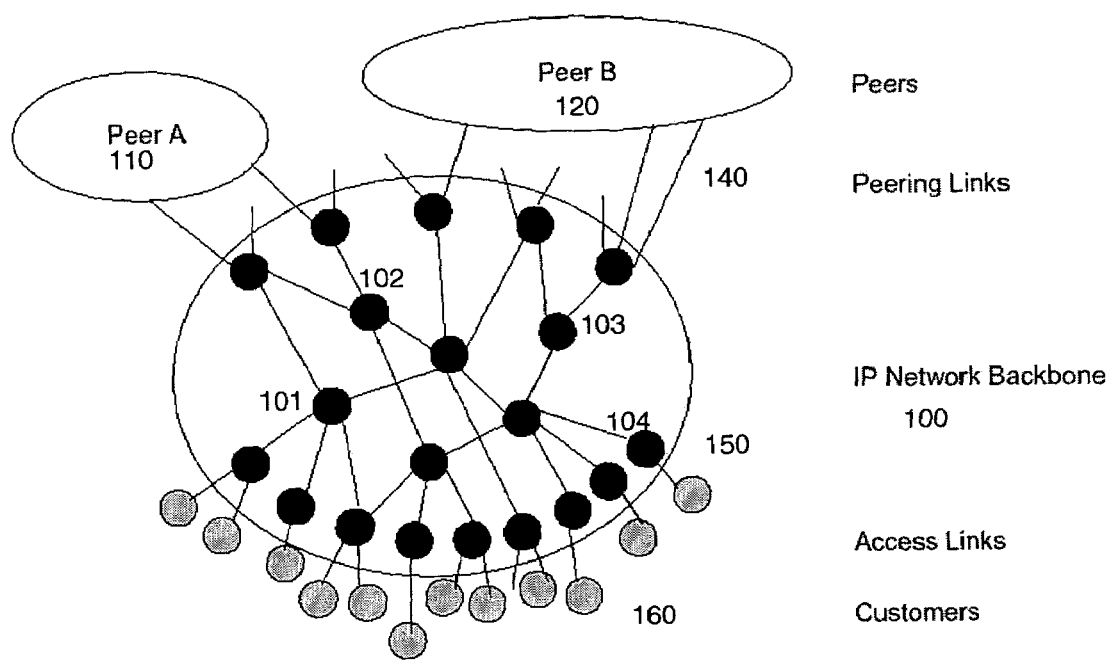
FIG. 1 is an abstract diagram of an illustrative IP backbone network.
Figure 2:
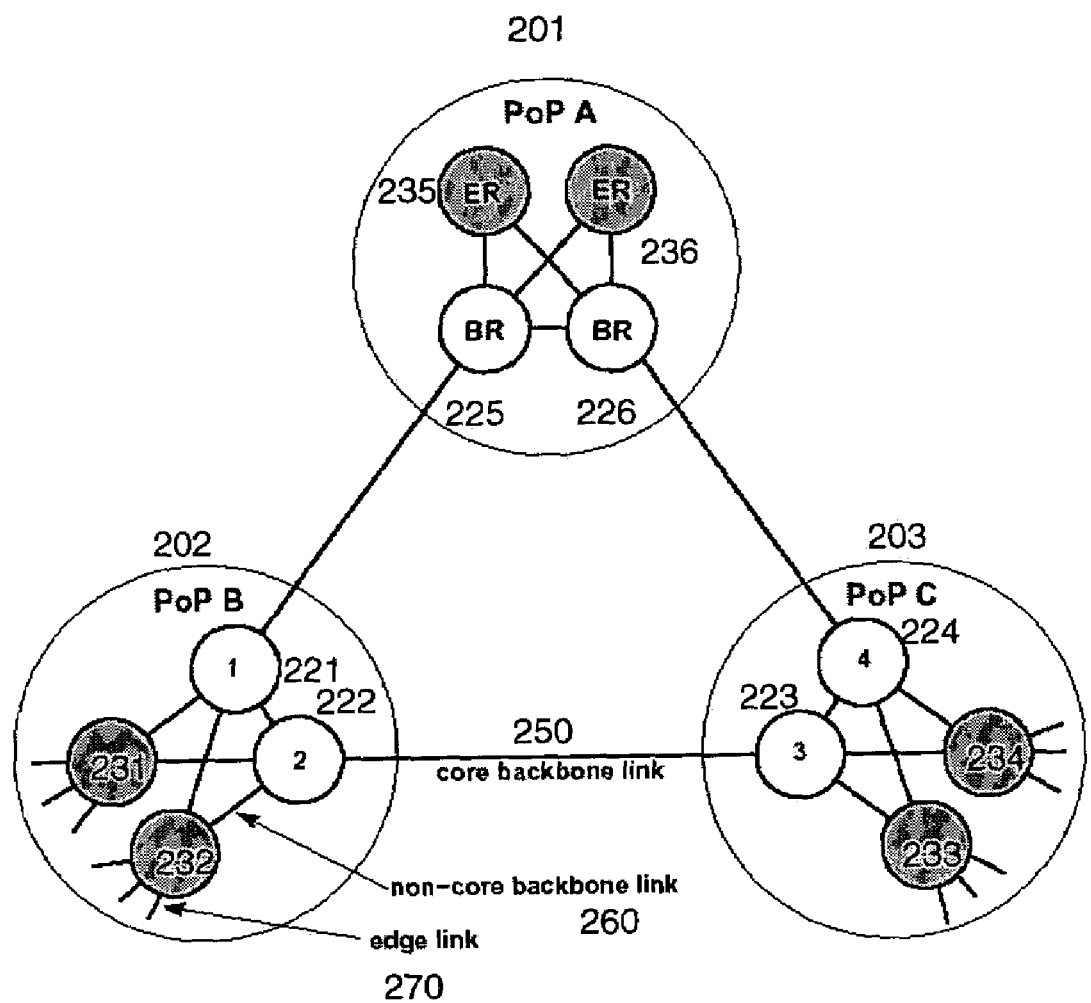
FIG. 2 is an abstract diagram of three points of presence in the illustrative IP backbone network.

FIG. 1 is an abstract diagram of an illustrative Internet Protocol (IP) backbone network. The IP backbone network 100, as depicted in FIG. 1, can be represented as a set of nodes and links, associated with the IP routers 101, 102, 103, 104, etc., and the IP adjacencies between those routers. The nodes and links wholly internal to the network 100 are referred to herein as backbone nodes and links; the others are referred to as edge nodes and links. A typical IP network managed by an Internet Service Provider (ISP) will connect via edge links to other autonomous systems (e.g., to a public Internet exchange point or directly to a private peer or transit provider) and customers (e.g., to a modem bank for dial-up users, a web-hosting complex, or a particular business or university campus). It is helpful to further categorize the edge links into access links 150, which connect to customers 160, and peering links 140, which connect to other non-customer autonomous systems, e.g., peers A 110 and B 120, as depicted in FIG. 1. It is also helpful, without loss of generality, to characterize those routers that terminate access and/or peering links as an edge router (ER) and those that terminate only backbone links as a backbone router (BR). FIG. 2 further illustrates this terminology. Three points-of-presence (PoPs) 201, 202, 203 in the IP backbone network are depicted, each with a number of BRs 221, 222, 223, 224, 225, 226 and ERs 231, 232, 233, 234, 235, 236. The links between BRs are referred to as core links, while the links between a BR and an ER are referred to as non-core links.

It is assumed that there is access to routing information in the IP backbone network 100. For example, in large IP networks, distributed routing protocols are used to build the forwarding tables within each router. It is possible to predict the results of these distributed computations from data gathered from router configuration files. See co-pending commonly-assigned United States Utility patent application Ser. No. 09/876,384, entitled "TRAFFIC ENGINEERING SYSTEM AND METHOD", which is incorporated by reference herein. There may be more than one route between two routers even using only shortest paths. It is assumed herein that traffic will be evenly distributed across all such routes, although the present methodology can be easily adapted by one of ordinary skill in the art to handle unequal distributions.

It is also assumed that some form of link load measurements are available in the IP backbone network 100. Although the present techniques can work with different types of network load data, including flow data, the present invention advantageously can take advantage of data widely available via the Simple Network Management Protocol (SNMP). See, e.g., D. Harrington, et al., "An Architecture for Describing SNMP Management Frameworks," Internet Engineering Task Force, Request for Comments 2571, April 1999. Since every router maintains a cyclic counter of the number of bytes transmitted and received on each of its interfaces, it is possible to obtain basic traffic statistics for the entire network with little additional infrastructure support. SNMP data notably has many limitations, which, preferably, should be taken into account in implementing a useful methodology. Data may be lost in transit, either due to SNMP utilizing unreliable UDP transport or to data loss when copying to a central archive. Data may be incorrect, e.g., through poor router vendor implementations. The data collection sampling interval is typically course, e.g. 5 minutes. Many of the typical problems in SNMP data may be removed with minimal artifacts using simple techniques. For instance, using hourly traffic averages, with five minute or finer data polls, mitigates the effect of missing data substantially. Slightly more sophisticated methods of anomaly detection and interpolation can produce even better results. It is advantageous to retain some of the unaveraged data for brief periods for troubleshooting and alarming.

The traffic matrix can be computed with different levels of aggregation at the source and destination endpoints, for instance, at the level of PoP to PoP, or router to router, or link to link. Intuitively, the aggregation level needs to be sufficiently high so that the traffic exchanged between different locations is not sensitive to the detailed composition of the traffic. On the other hand, when the aggregation level is too high (e.g., PoP to PoP), ISP routing policies operating at a more granular level may have a profound impact and can introduce serious systematic distortion to the overall traffic pattern. The inventors have found it advantageous to utilize router to router matrices, which are appropriate for a number of network and traffic engineering applications—and which, where useful, can be used to construct more highly aggregated traffic matrices (e.g., PoP to PoP) using routing information. Given two ERs $E_i$ and $E_j$, the traffic between these edge routers $T_{ij}^E$ is defined as the total amount of traffic that enters the network at $E_i$ and exits at $E_j$, with $T^E=\{T_{ij}^E\}$ the associated matrix. Similarly, given two BRs, the traffic between these backbone routers $T_{ij}^B$ is defined such that the elements of the associated matrix, $T^B=\{T_{ij}^B\}$, refer to traffic that enters and leaves the core. The traffic matrix t will often be referred to below in a vector form, in which the indices of the vector refer to source/destination pairs.

Figure 3:
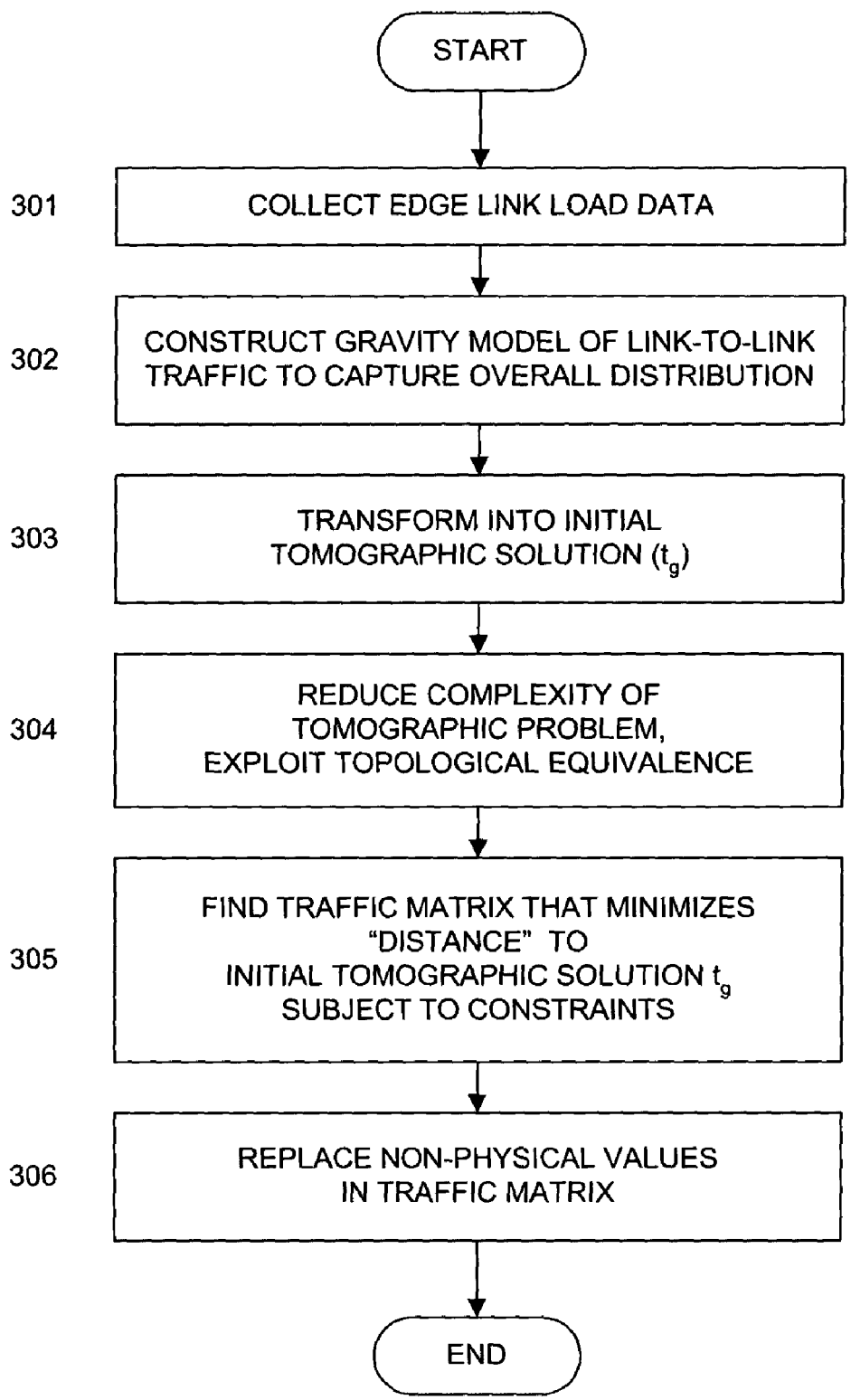
FIG. 3 is a flowchart of processing performed to determine a traffic matrix, in accordance with an preferred embodiment of an aspect of the present invention.

FIG. 3 is a flowchart of processing performed to determine the network traffic matrix, in accordance with a preferred embodiment of the present invention. The processing can be readily performed by software or firmware on a fast computer processor, such as a Sun Microsystems 336 MHz UltraSPARC-II processor, with access to the above-mentioned link load measurements and routing information.

At step 301, the link load measurements are collected. Where, for example, SNMP data is being utilized, an SNMP "poller" can be readily implemented in the network to periodically request an appropriate Management Information Base (MIB) from the relevant devices in the network. The data can then be stored in an archive and averaged, aggregated, or interpolated, where appropriate, before further processing.

At step 302, the overall distribution of traffic in the network is captured using a simple model of the link-to-link traffic. For example, one of simplest approaches to modeling the link-to-link traffic is to apply what is referred to in the art as a "gravity model". A general formulation of a gravity model is given by the following equation:

$$X_{i,j} = \frac{R_i \cdot A_j}{f_{i,j}}$$

where $X_{i,j}$ is the matrix element representing the force from i to j; $R_i$ represents the repulsive factors that are associated with "leaving" from i; $A_j$ represents the attractive factors that are associated with "going" to j; and $f_{i,j}$ is a friction factor from i to j. Gravity models, which take their name from Newton's law of gravitation, are commonly used by social scientists to model the movement of people, goods, or information between geographic areas. In the present context, $X_{i,j}$ can be interpreted as the traffic volume that enters the network at location i and exits at location j; the repulsion factor Ri as the traffic volume entering the network at location i, and the attractivity factor $A_j$ as the traffic volume exiting at location j. The friction matrix, $f_{i,j}$, can encode the locality information specific to different source-destination pairs. It is necessary to approximate the actual friction matrix using models with fewer parameters. In the embodiment described herein, a common constant is assumed for the friction factors, arguably the simplest among all possible approximation schemes. The resulting network gravity model simply states that the traffic exchanged between locations is proportional to the volumes entering and exiting at those locations.

A simple gravity model can be utilized to estimate the amount of traffic between edge links as follows: Denote the edge links by $l_1, l_2, \ldots$ . The volume of traffic $T(l_i, l_j)$ that enters the network at edge link $l_i$ and exits at edge link $l_j$ is estimated. Let $T_{link}^{in}(l_i)$ denote the total traffic that enters the network via edge link $l_i$, and $T_{link}^{out}(l_j)$ the corresponding quantity for traffic that exits the network via edge link $l_j$. The gravity model can then be computed by either of $$T(l_i, l_j) = T_{link}^{in}(l_i) \frac{T_{link}^{out}(l_j)}{\sum_k T_{link}^{out}(l_k)},$$

$$T(l_i, l_j) = \frac{T_{link}^{in}(l_i)}{\sum_k T_{link}^{in}(l_k)} T_{link}^{out}(l_j)$$

The first equation states that the traffic matrix elements $T(l_i, l_j)$ are the product of the traffic entering the network via edge link $l_i$ and the proportion of the total traffic leaving the network via edge link $l_j$, while the second is reversed and is identical under traffic conservation—that is, the assumption that the interior network is neither a source, nor sink of traffic. While this assumption is violated (e.g., protocols running in the network interior act sources and sinks, and packet drops act as sinks) the volumes involved are insignificant in the network considered. Most notably the actual results from the two equations are almost identical.

It is possible and preferable to generalize the above simple gravity model to take into account a wide range of additional information provided by link classification and routing policy. For example, typically, in large North-American ISPs, the majority of traffic is exchanged between network customers and network peers. The pattern and handling of customer and peer traffic are quantitatively different, and this has a large impact on the traffic matrix. Furthermore, this peering traffic has a large impact on every aspect of network design and engineering, and so estimating the associated traffic matrices is very important. It is advantageous to adapt the gravity model to specifically differentiate between customer and peering traffic.

A generalized gravity model can be constructed as follows. It is assumed that the network has a set of peers labeled $P_1, P_2, \ldots$, and exchanges traffic with peer $P_i$ over a set of edge links dedicated to this peer. This is commonly termed private peering and is the dominant mode of peering for large IP backbones today. A set of customer access links are labeled $a_1, a_2, \ldots$, and a set of peer links are labeled $p_1, p_2, \ldots$. The set of edge links carrying traffic to peer $P_i$ is denoted by $\mathcal{P}_i$, and the set of all peer links by $\mathcal{P}$. The set of all customer access links is denoted by $\mathcal{A}$. SNMP measurements provide volumes of traffic on all edge links, $$j : T_{link}^{in,out}(j),$$

where the superscripts in (out) denotes traffic into (out of) the backbone. The traffic entering, or exiting the network to peer $P_i$, is $$T_{peer}^x(P_i) = \sum_{p \in \mathcal{P}_i} T_{link}^x(p),$$

where x=in or out. Then, the outbound traffic from access link $a_i \in \mathcal{A}$ to peering link $p_m \in \mathcal{P}_j$ is $$T_{outbound}(a_i, p_m) = \begin{cases} \dfrac{T_{link}^{in}(a_i)}{\sum_{a_k \in \mathcal{A}} T_{link}^{in}(a_k)} T_{peer}^{out}(P_j), & \text{if } p_m = X(a_i, P_j), \\ 0, & \text{otherwise.} \end{cases}$$

where X is the exit peering link, as explained below. The inbound traffic from peering link $p_i$ to access link $a_j$ is $$T_{inbound}(p_i, a_j) = T_{link}^{in}(p_i) \dfrac{T_{link}^{out}(a_j)}{\sum_{a_k \in \mathcal{A}} T_{link}^{out}(a_k)}.$$

The internal traffic from access link $a_i$ to access link $a_j$ is $$T_{internal}(a_i, a_j) = \dfrac{T_{link}^{in}(a_i)}{\sum_{a_k \in \mathcal{A}} T_{link}^{in}(a_k)} T_{internal}^{out}(a_j).$$

where $$T_{internal}^{out}(a_j) = T_{link}^{out}(a_j) - \sum_{p_k \in \mathcal{P}} T_{inbound}(p_k, a_j)$$

$$= T_{link}^{out}(a_j) \left( 1 - \dfrac{\sum_{p_i \in \mathcal{P}} T_{link}^{in}(p_i)}{\sum_{a_k \in \mathcal{A}} T_{link}^{out}(a_k)} \right).$$

These equations are developed from the following assumptions, which reflect dominant Internet and ISP routing policies:

Transit peer (peering link to peering link) traffic. It is assumed that the volume of traffic that transits across the backbone from one peer network to another is negligible. Transit traffic between peers may reflect a temporary step in network consolidation following an ISP merger or acquisition, but should not occur under normal operating circumstances.

Outbound (access link to peering link) traffic. The proportionality assumption underlying gravity modeling is applied on a peer-by-peer basis: that is, the traffic exiting a specific peer comes from each access link in proportion to the traffic on that access link. It is assumed that all of the traffic from a single access link to the given peer exits the network on the same peering link (as determined by the Interior Gateway Protocol (IGP) and Border Gateway Protocol (BGP) routing configuration). The exit peering link for traffic from access link $a_i$ to peer $P_j$ is denoted by $X(a_i, P_j)$, which may be derived from routing configuration information. The assumption is typically true in practice, except for example when short-term load balancing is performed. In such situations, the above methodology could be supplemented with available statistics on the affected prefixes, though the inventors' experience has been that the impact is small and does not affect the accuracy of the traffic matrix computation.

Inbound (peering link to access link) traffic. A network operator has little control over the injection of traffic into its network from peer networks. Accordingly, it is assumed that the traffic entering from a given peering link is split amongst the access links in proportion to their outbound traffic.

Internal (access link to access link) traffic. It is assumed that the fraction of internal traffic from a given access link $a_i$ to a second access link $a_j$ is proportional to the total traffic entering the network at $a_i$, and that the traffic between the links can be computed by normalization.

The generalized gravity model has been found by the inventors to match actual Internet data very well. One possible explanation for this is that geographic locality is not a major factor in today's Internet, as compared to ISP routing policies. As long as the gravity model captures the essence of the routing policies, it becomes very accurate and the choice of the above-mentioned friction factor is less critical. It is certainly possible to further improve the above method by using a more accurate model with additional parameters. However, the margin for improvement may be limited.

With reference again to FIG. 3, the result of the link-to-link gravity model at step 302 is a traffic matrix that is not guaranteed to be consistent with the internal link measurements in the network—a significant drawback. This is remedied, in accordance with an aspect of the invention, by utilizing a tomographic approach. It is not expected nor required that the above gravity model accurately model the traffic between all source-destination pairs. In fact, one would naturally expect certain pairs of locations to stand out from the overall distribution, simply due to their specific characteristics (e.g., going through transoceanic links). Rather, the model need only capture the overall distribution. It is expected that tomographic estimation can be utilized to correct most of the violations in the assumptions underlying the model and thus significantly improve the accuracy.

Tomographic methods are based on the system of linear equations x=A t where t is the traffic matrix, x represents the link loads, and A the network routing matrix. The traffic matrix t is written as a column vector $t=(t_1, t_2, \ldots, t_m)^T$, where the M traffic matrix elements, $t_r$, are the traffic between the rth source/destination pair. The link traffic is the sum of the traffic matrix elements that are routed across that link. The traffic (as measured in packets or bytes) that traverses the L links of the network during some period is represented as the set of observables $x=(x_1, x_2, \ldots, x_L)^T$. The L×M routing matrix $A=\{A_{ir}\}$ where $$A_{ir} = \begin{cases} F_{ir}, & \text{if traffic for } r \text{ traverses link } i \\ 0, & \text{otherwise} \end{cases}$$

where $F_{ir}$ is the fraction of traffic from source/destination pair r that traverses link i. In essence, the equation x=A t states that the traffic matrix must be consistent with network routing and measured link loads throughout the network, not just at the edge. This matrix equality is, however, highly under-constrained, and so allows many solutions. Tomographic methods differ in how a single "best" solution is identified from the possibilities. The majority of existing statistical tomographic approaches (commonly referred to as "network tomography" methods) use models of the higher order statistics of the link load data to create additional constraints. The present invention advantageously does not incorporate additional constraints, but rather uses the gravity model to obtain an initial estimate of the solution, which is further refined to satisfy the constraints.

With reference again to FIG. 3, at step 303, the results of step 302 are transformed into an initial traffic matrix solution, referred to herein as $t_g$. It is advantageous and preferable to transform the link-to-link model results into a more tractable problem, such as a BR-to-BR traffic matrix using routing information. BR-to-BR traffic matrices are generally more useful for traffic engineering tasks such as load balancing and are absolutely necessary for link/router failure analysis. In addition, more highly aggregated traffic matrices, such as POP-to-POP traffic matrices, may be directly derived from BR-to-BR matrices using routing information. Even considering only a hundred backbone routers, this leads to a problem with over a thousand unknowns, which is orders of magnitude more than the available constraints on link traffic volume.

Accordingly, at step 304, the complexity of the tomographic problem for the border router traffic matrix is advantageously reduced, in one embodiment, by removing empty demands from the initial traffic matrix solution. First, since there may be multiple BRs within each PoP, traffic will flow only between the closest of these as determined by IGP routing—thereby, rendering many of the BR-to-BR matrix elements empty. As depicted in the simplified illustrative topology of FIG. 2, there are two BRs in each PoP, connecting ERs within the PoP with redundant links. Given shortest path routing (and equal link weights on backbone links), it can be seen that all of the traffic from PoP B 202 to PoP C 203 will traverse the route through BRs 222 and 223, while there will be no traffic entering the backbone nodes at BR 221 and departing at BR 224. While this is a very simple example, in operational IP networks, the set of paths consistent with IP routing will typically be significantly less than the set of all paths between router pairs.

Figure 4:
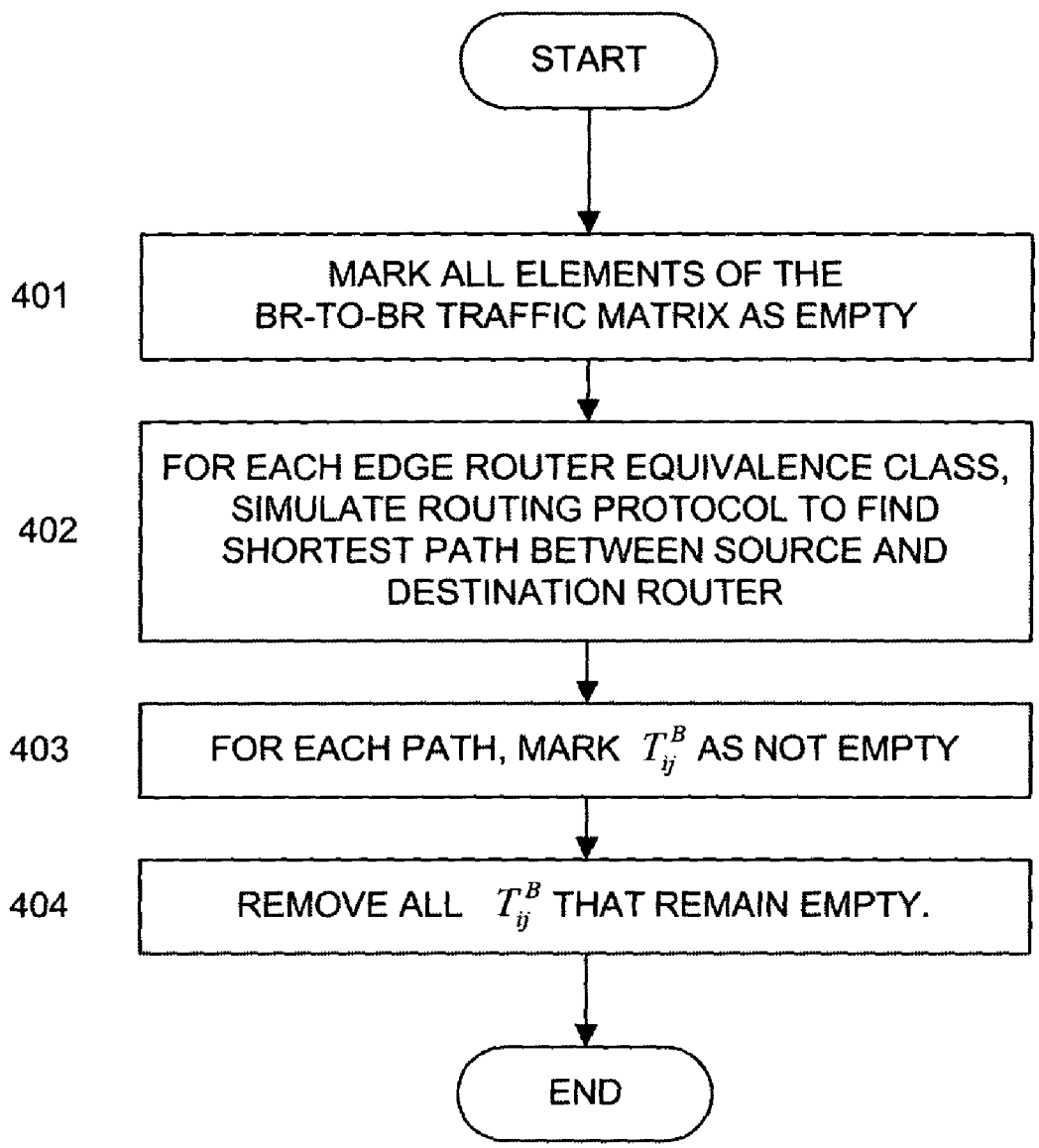
FIG. 4 is a flowchart of processing performed to remove the empty demands in the initial tomographic solution, thereby reducing the complexity of the tomographic problem, in accordance with an embodiment of another aspect of the invention.

FIG. 4 is a flowchart of processing performed to remove the empty demands in the initial traffic matrix solution, in accordance with an embodiment of another aspect of the invention. The traffic matrix from BR $B_i$ to $B_j$ is denoted $T_{ij}^B$. At step 401, all elements of the BR to BR traffic matrix are initially marked as empty. At step 402, the routing protocol, e.g., the Interior Gateway Protocol (IGP), is simulated to find the shortest paths between each source and destination router. At step 403, for each path, let $B_i$ and $B_j$ be its first and last BRs respectively, and mark $T_{ij}^B$ as not empty. Then, at step 404, remove all $T_{ij}^B$ that remain empty. This step is equivalent to removing elements from t that will be zero because the corresponding route is not used (unless failures occur).

Step 402 in FIG. 4 would typically be done for each pair of edge routers, which can be prohibitive due to the large number of routers. However, the "topological equivalence" of edge routers can be exploited to avoid having to run simulations for all possible pairs of routers. Two edge routers are said to be "topologically equivalent" if they connect to the same (non-empty) set of BRs and the protocol weights on the corresponding links are the same. (It should be noted that there may be multiple layer hierarchy of ERs within a PoP, and lower layer ERs pass traffic to BRs only through the higher layer ERs. The lower layer of ERs may be removed from consideration as their (network compacting) traffic can be seen at the higher layer.) Such equivalent edge routers can be grouped together and considered as what the inventors refer to as a single edge router equivalence class (EREC). The routes between the component ERs of the same pair of ERECs advantageously should be the same except for the first and last links. Consequently, only one IGP simulation need be run for each pair of ERECs. Computing routes on the above basis can reduce the computational burden by a factor of 20. After eliminating all of the empty demands, the number of unknowns can be reduced by a factor of 10, thereby turning a highly under-constrained linear inverse problem (with potentially hundreds of constraints and tens of thousands of unknowns) into a moderately under-constrained problem (with hundreds of constraints and about a thousand unknowns), and making the computation orders of magnitude faster.

Figure 5:
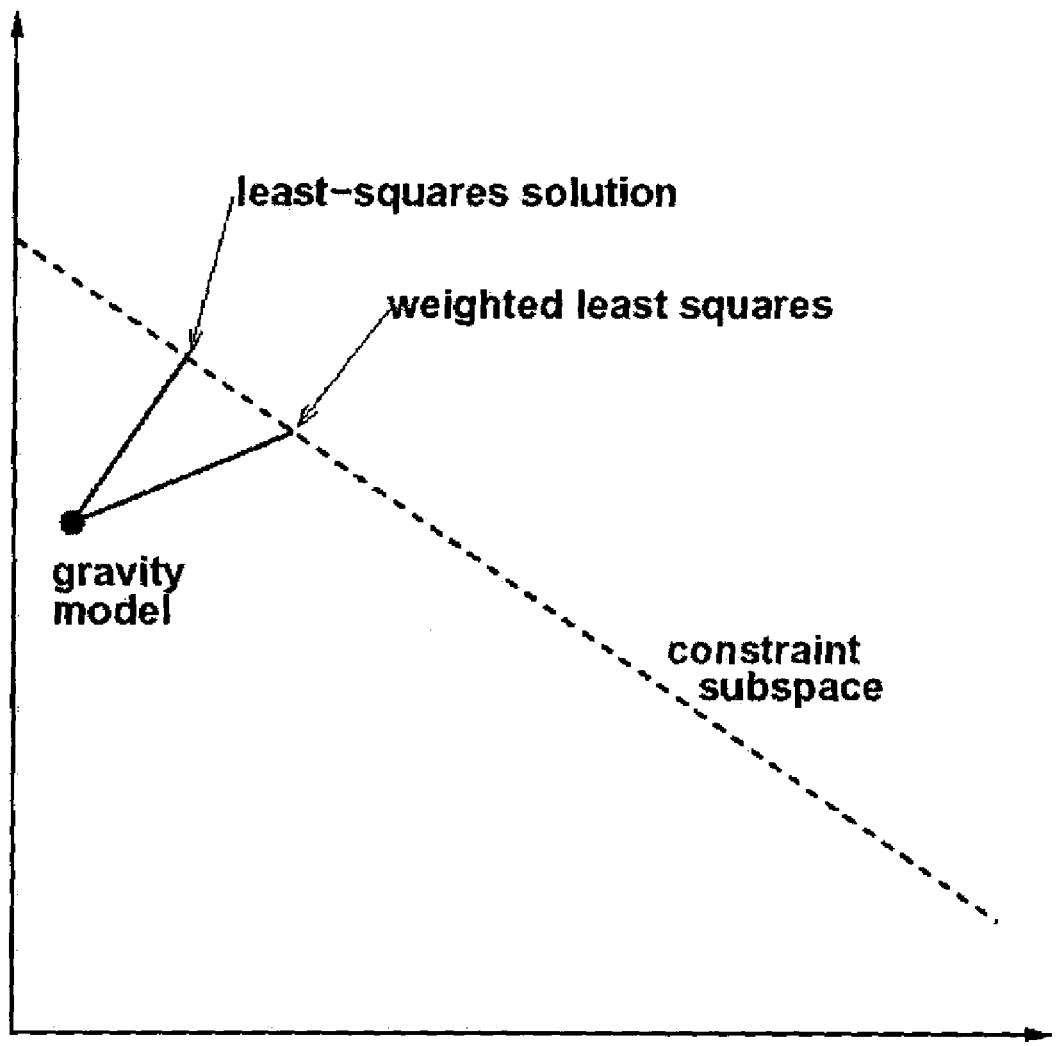
FIG. 5 is an graph abstractly illustrating how the gravity model solution is utilized to obtain the final solution using a tomographic approach.

Finally, at step 305 in FIG. 3, an optimization-based tomographic approach is utilized to refine the initial gravity model solution. As depicted abstractly in FIG. 5, the final estimate of the traffic matrix is selected by choosing the solution in the space of those admitted by the tomographic model that is "closest" to the solution obtained by the gravity model, in accordance with some form of objective function or distance metric. For example, the gravity model may be refined using a least-squares solution that minimizes the Euclidean distance to the gravity model solution subject to the tomographic constraints, as depicted in FIG. 5. More specifically, the following quadratic program could be solved $$\min \|t - t_g\|$$
$$\text{s.t.} \quad \|At - x\| \text{ is minimized}$$

where $\|.\|$ is the $L_2$ norm of the vector, i.e. the Euclidean distance to the origin). As another example, a weighted least-squares solution could be utilized, in which the projection onto the subspace is not orthogonal, but rather weighted by a function of the size of the estimated traffic matrix elements ($t_g$). That is, the equation $\|(t-t_g)/w\|$ could be used as the objective function to minimize in the above quadratic program, where w is the weight vector, and/is the element-by-element vector division. As illustrated in FIG. 5, the simple least-square solution is just an orthogonal projection of the gravity model solution onto the constraint sub-space. The weighted least squares solution, on the other hand, gives different weight to different unknowns in the solution.

Note that the tomographic constraints may be ill-posed due to possible dependency among different link constraints. Furthermore, the constraints may not be satisfiable due to error and noise in the link load data or possible routing changes that are not captured by the topology data. The standard technique for dealing with ill-posed quadratic programs is to use Singular Value Decomposition (SVD) of the routing matrix A to compute its pseudo-inverse. The resulting solution is the closest to the initial solution $t_g$ among all solutions that minimize the discrepancy against the tomographic constraints ($\|At-x\|$). Routines to compute the pseudo-inverse are available in many numerical computing packages, e.g. MATLAB. FIG. 6 lists MATLAB source code that implements such an approach.

It should be noted that, where an approach such as least-squares is utilized, the methodology may result in negative values, which are clearly without physical meaning. Accordingly, at step 306 in FIG. 3, these non-physical values should be corrected. One approach to avoiding these values is to view the problem as a constrained optimization problem. However, a simple iterative procedure provides a fast and effective alternative. Specifically, Iterative Proportional Fitting (IPF) can be utilized to ensure non-negativity. See J. Cao, D. Davis, S. V. Wiel, and B. Yu, "Time0varying network tomography: router link data," J. Amer. Statist. Assoc., Vol. 95, No. 452, pp. 1063-1075 (2000), which is incorporated by reference herein. For the initial estimate, the traffic matrix estimated above can simply be used, with zero replacing the negative elements of the matrix. IPF then proceeds by successively refining the estimate using the above-disclosed method. The computation is simpler and the initial condition is not complex, since higher order statistics of the process are not modeled.

The above embodiment of the present invention is remarkably fast, taking as little as 5 seconds on a 336 MHz UltraSPARC-II processor to compute a backbone router to backbone router traffic matrix on a tier-1 IP network.

The complexity of the generalized gravity model is $O(N^2)$ in the number of edge links being considered, but the number of operations per term is small. The worst case complexity of the above quadratic program is linear in the number of unknowns (elements in the traffic matrix), and quadratic in the number of constraints. In practice, however, the complexity of singular value decomposition methods is generally less than this. For instance, the SVD used in MATLAB are usually better than this complexity estimate would indicate. In reality, this computation can run significantly under 2 seconds. Computation of the generalized gravity model for a complete network on the order of 1000 routers can take less than 3 seconds. Computing routes by taking advantage of edge router equivalence classes can reduce the computational burden by a factor of 20. The time taken in computing the routing matrix dominates all other aspects of the above embodiment, taking two to three minutes. It should be noted, however, that this cost can often by amortized over multiple traffic matrix computations because the routing matrix need be recomputed only when the network topology changes. The method used to reduce the problem size can be performed as part of computing the routing matrix with a computational cost that is a very small marginal cost on top of computing the routing matrix itself.

The inventors have tried the above embodiment utilizing straight least-squares and a range of different weighting schemes, including constant weighting, linearly proportional to the terms in the gravity model traffic matrix, and/or proportional to the square root of the gravity model. The inventors have generally found that (a) the simple gravity model is better than the raw least-squares approach, (b) the generalized gravity model is better than the simple gravity model, and (c) the best results come from using the generalized gravity model with the weighted least-squares method using square root weights (though the improvement over using other weightings is small). Moreover, the inventors have found that, even where there are errors in the traffic matrix, the results can still be used for a range of operational tasks such as detecting traffic changes. The overall approach is robust to measurement errors on the observables.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to IP backbone networks. However, the principles of the present invention could be readily extended to other network architectures. Such an extension could be readily implemented by one of ordinary skill in the art given the above disclosure.

What is claimed is:

1. A method of measuring traffic volume from a plurality of ingress points to a plurality of egress points in a network, the method comprising:

collecting link load measurements on links between the ingress points and the egress points;

constructing a gravity model of link to link traffic utilizing the link load measurements to capture an overall distribution of the volume of traffic between the ingress points and the egress points; and finding a traffic matrix that minimizes a distance metric subject to tomographic constraints to an initial tomographic solution based on the gravity model, the traffic matrix further comprising elements that specify the traffic volume from the plurality of ingress points to the plurality of egress points in the network.

2. The method of claim 1 wherein the initial tomographic solution is modified to remove empty demands based on simulations of routing in the network.

3. The method of claim 2 wherein simulations are run only on routes that are not topologically equivalent.

4. The method of claim 3 wherein the ingress points and the egress points are border routers in an Internet Protocol (IP) backbone network.

5. The method of claim 4 wherein the gravity model differentiates between customer and peering traffic in the IP backbone network.

6. A computer readable medium comprising executable instructions for performing a method of measuring traffic volume from a plurality of ingress points to a plurality of egress points in a network, the method comprising:
    collecting link load measurements on links between the ingress points and the egress points;
    constructing a gravity model of link to link traffic utilizing the link load measurements to capture an overall distribution of the volume of traffic between the ingress points and the egress points; and
    finding a traffic matrix that minimizes a distance metric subject to tomographic constraints to an initial tomographic solution based on the gravity model, the traffic matrix further comprising elements that specify the traffic volume from the plurality of ingress points to the plurality of egress points in the network.

7. The computer readable medium of claim 6 wherein the initial tomographic solution is modified to remove empty demands based on simulations of routing in the network.

8. The computer readable medium of claim 7 wherein simulations are run only on routes that are not topologically equivalent.

9. The computer readable medium of claim 8 wherein the ingress points and the egress points are border routers in an Internet Protocol (IP) backbone network.

10. The computer readable medium of claim 9 wherein the gravity model differentiates between customer and peering traffic in the IP backbone network.

\* \* \* \* \*